United States Patent
Pawlowski et al.

[11] Patent Number: 5,996,042
[45] Date of Patent: Nov. 30, 1999

[54] SCALABLE, HIGH BANDWIDTH MULTICARD MEMORY SYSTEM UTILIZING A SINGLE MEMORY CONTROLLER

[75] Inventors: Stephen S. Pawlowski, Beaverton; Peter D. MacWilliams, Aloha, both of Oreg.

[73] Assignee: Intel Corporation, Santa Clara, Calif.

[21] Appl. No.: 08/766,955

[22] Filed: Dec. 16, 1996

[51] Int. Cl.[6] .................................................. G06F 13/16
[52] U.S. Cl. ............................................ 711/105; 711/154
[58] Field of Search .................................. 711/105, 154, 711/168, 169

[56] References Cited

U.S. PATENT DOCUMENTS

| | | | |
|---|---|---|---|
| 5,386,383 | 1/1995 | Raghavachari | 365/189.05 |
| 5,463,755 | 10/1995 | Dumarot | 711/148 |
| 5,469,558 | 11/1995 | Lieberman | 395/205 |
| 5,479,635 | 12/1995 | Kametani | 711/5 |
| 5,530,836 | 6/1996 | Busch | 711/150 |
| 5,638,534 | 6/1997 | Mote, Jr. | 711/158 |
| 5,682,498 | 10/1997 | Harness | 711/106 |
| 5,701,433 | 12/1997 | Moriarty | 711/154 |
| 5,761,694 | 6/1998 | Rao | 711/5 |
| 5,778,413 | 7/1998 | Stevens | 711/5 |
| 5,778,447 | 7/1998 | Kuddes | 711/105 |
| 5,787,267 | 7/1998 | Leung | 711/105 |

*Primary Examiner*—David L. Robertson
*Assistant Examiner*—Christopher S. Chow
*Attorney, Agent, or Firm*—Kenyon & Kenyon

[57] ABSTRACT

A high speed memory interface for a processor-based computing system provides a bridge component (made up of a controller and a data path), one or more data multiplexer/buffers, and a plurality of RAS/CAS generators. The high speed memory interface allows for the expansion of the memory subsystem without additional loading on the processor/system bus and without a reduction in memory transaction performance. The interface includes a single controller for receiving memory transaction commands from the processor/system bus, and a plurality of RAS/CAS generators, for generating RAS/CAS signals in response to memory transaction commands forwarded by the controller. Each RAS/CAS generator is coupled to one or more memory banks. A data multiplexer/buffer is coupled to one or more of the memory banks, and provides an interface between the memory bank(s) and the data path.

11 Claims, 8 Drawing Sheets

SCALABLE, HIGH BANDWIDTH MULTICARD MEMORY SYSTEM UTILIZING A SINGLE MEMORY CONTROLLER

FIELD OF THE INVENTION

The present invention relates generally to processor-based computing systems, and more specifically to a high speed memory system interface which allows for main memory expansion without additional load on the processor bus.

BACKGROUND INFORMATION

The newest processor subsystems for computing devices run on very high speed interconnects and include increasingly higher frequency processors. In order to take full advantage of the extra processor computing power such advanced processor subsystems provide, the amounts of system resources, such as main memory, must be increased. Traditionally, each additional memory subsystem added to a computing system has had its own memory controller connected directly to the processor/system bus. Dedicated memory controllers for each subsystem were necessary because of the limitations on the number of row address strobe/column address strobe (RAS/CAS) lines that each individual memory controller could drive. By attaching each memory subsystem to the processor/system bus directly, all memory subsystems thus have the same performance criteria, in terms of, e.g., latency, timing, bandwidth, etc.

With the ever-increasing bus frequencies available, however, loads on the processor/system bus must be minimized so as not to degrade system performance. Direct coupling of multiple memory controllers and associated memory subsystems to the processor/system bus, therefore, should be avoided, if possible. Thus, it is desired to provide a capability for expansion of the memory resources in a computing system, without a concomitant increase in load on the processor/system bus and without a reduction in memory transaction performance.

SUMMARY OF THE INVENTION

The present invention provides a high speed memory interface for a processor-based computing system. The interface is coupled to the processor/system bus through a bridge component made up of a controller and a data path, and allows for the expansion of the memory subsystem without additional loading on the processor/system bus and without a reduction in memory transaction performance. The high speed memory interface provides a single memory controller for receiving memory transaction commands from the processor/system bus, and includes a plurality of RAS/CAS generators, coupled to the controller, for generating RAS/CAS signals in response to memory transaction commands forwarded by the controller. Each RAS/CAS generator is, in turn, coupled to one or more memory banks. A data multiplexer/buffer is coupled to one or more of the memory banks, and provides an interface between the memory bank(s) and the data path.

DETAILED DESCRIPTION

The present invention provides a high speed memory interface for a processor-based computing system. The memory interface is coupled to the computing system's processor/system bus through a bridge component, and it allows for the expansion of the memory subsystem without additional loading on the processor/system bus and without a concomitant increase in memory transaction latency. The high speed memory interface according to an embodiment of the present invention provides a single memory controller for multiple memory cards, and allows for the same memory transaction performance, in terms of, timing, bandwidth, etc., for each additional memory card as is possible with only a single memory card.

Figure 1:
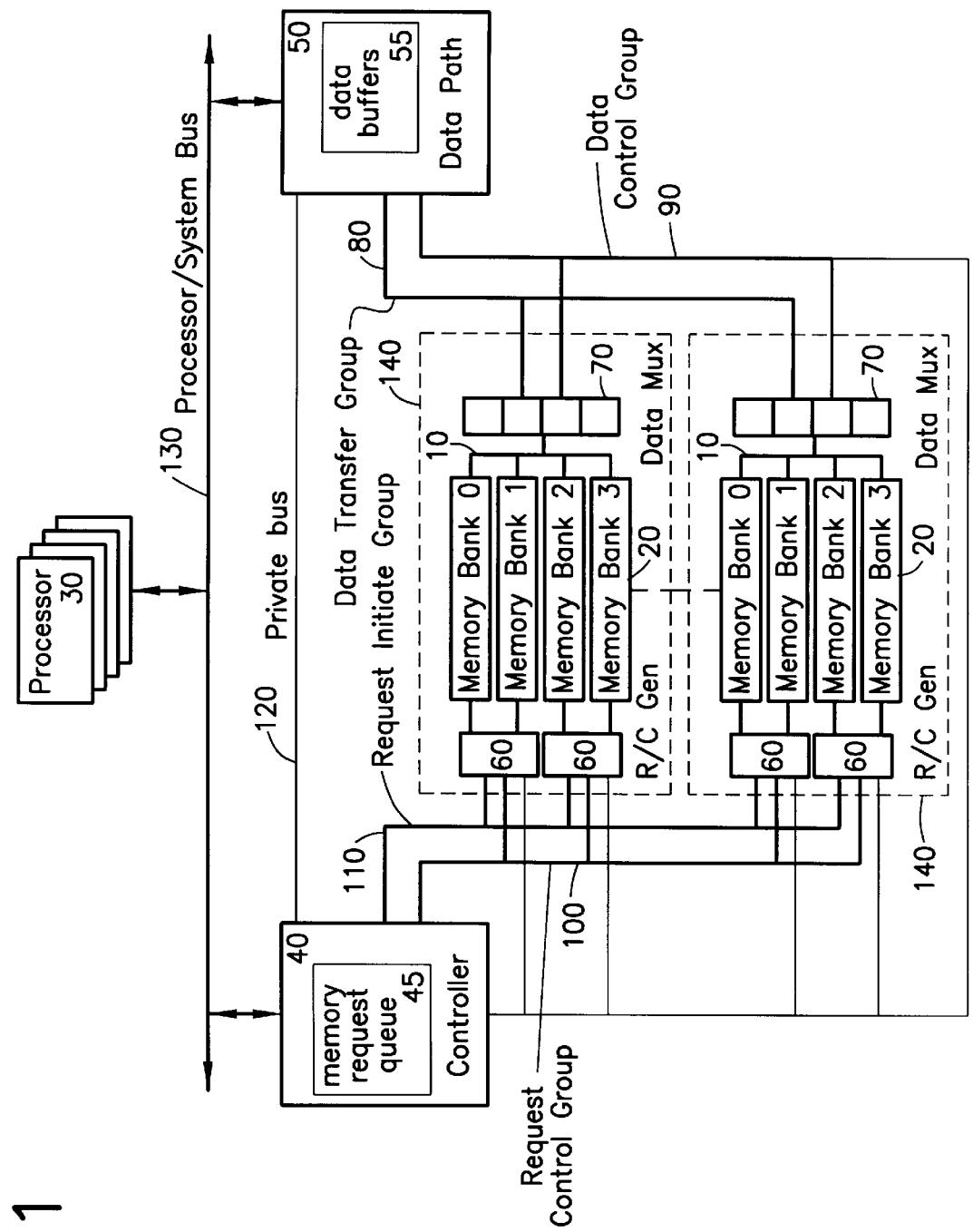
FIG. 1 depicts a memory subsystem block diagram including a high speed memory interface according to an embodiment of the present invention.

FIG. 1 depicts a memory subsystem block diagram including a high speed memory interface according to an embodiment of the present invention. The memory interface as illustrated in FIG. 1 is comprised of a controller 40, data path 50, one or more row address strobe/column address strobe (RAS/CAS) generators 60, and one or more data multiplexer/buffers 70. Within the controller 40 is a memory request queue 45. Within the data path 50 are one or more data buffers 55. The controller 40 and data path 50 of the illustrated memory interface are coupled to the computer system's processor/system bus 130, which is in turn coupled to the computer system's processor subsystem 30.

According to the embodiment of the present invention illustrated in FIG. 1, the computer system's main memory is distributed among multiple memory cards 140. Each memory card 140 in the illustrated embodiment includes two RAS/CAS generators 60, each of which is coupled to two memory banks 20. The memory banks 20 are coupled to a memory data bus 10, which is in turn coupled to a data multiplexer/buffer 70. The configuration in FIG. 1 is but one example of a memory subsystem configuration which can be employed in practicing the present invention. For example, the number of memory cards 140, the number of RAS/CAS generators 60 per memory card 140, the member of memory banks 20 per RAS/CAS generator 60, and the number of data multiplexer/buffers 70 that can be employed in practicing the present invention may all vary from what is shown in FIG. 1.

The controller 40 and data path 50 of the embodiment of the present invention depicted in FIG. 1 together comprise the "bridge" component of the memory interface, as they are the elements of the interface coupled to the processor/system bus 130. The bridge components may be included on the same or on separate semiconductor chips.

In conventional memory subsystems, a separate memory controller, which receives memory transaction commands from the processor/system bus and generates the RAS/CAS signals needed for memory access, is required for each memory card in the memory subsystem. According to an embodiment of the present invention, however, a single memory controller 40 is provided for receiving memory transaction commands from the processor/system bus 130 for all memory cards 140, and multiple RAS/CAS generators 60 are provided, each of which receives memory commands from the controller 40 and generates the appropriate RAS/CAS signals. This configuration allows for memory transaction concurrency, as the controller 40 can continue to issue memory transaction commands, in a pipelined fashion, to the RAS/CAS generators 60 while previously-issued commands are being executed. This configuration also allows for consistency in memory transaction performance, regardless of the addition of further memory cards 140.

Data and control information within the illustrated memory interface are communicated via various communication signal groups. A request initiate group 110 is used to communicate memory transaction commands and the associated addresses of targeted memory locations. A request control group 100 communicates handshaking signals related to performance of memory transactions. A data transfer group 80 carries data to and from the memory cards 140. A data control group 90 communicates handshaking signals related to the transfer of data to and from the memory cards 140.

In addition to the various signal groups, a private bus 120 provides another communication path. The private bus 120 carries control and handshaking signals which relate to the transfer of data between the data path 50 and the processor/system bus 130. Examples of the signals which may be transmitted between the controller 40 and the data path 50 over the private bus 120 are discussed in the U.S. patent application entitled A METHOD AND APPARATUS FOR CONTROLLING DATA TRANSFERS BETWEEN A BUS AND A MEMORY DEVICE USING A MULTI-CHIP MEMORY CONTROLLER (Pawlowski, et al.), Ser. No. 08/536,662, which was filed on Sep. 29, 1995, now U.S. Pat. No. 5,812,803 and is hereby incorporated by reference in its entirety.

Figure 2:
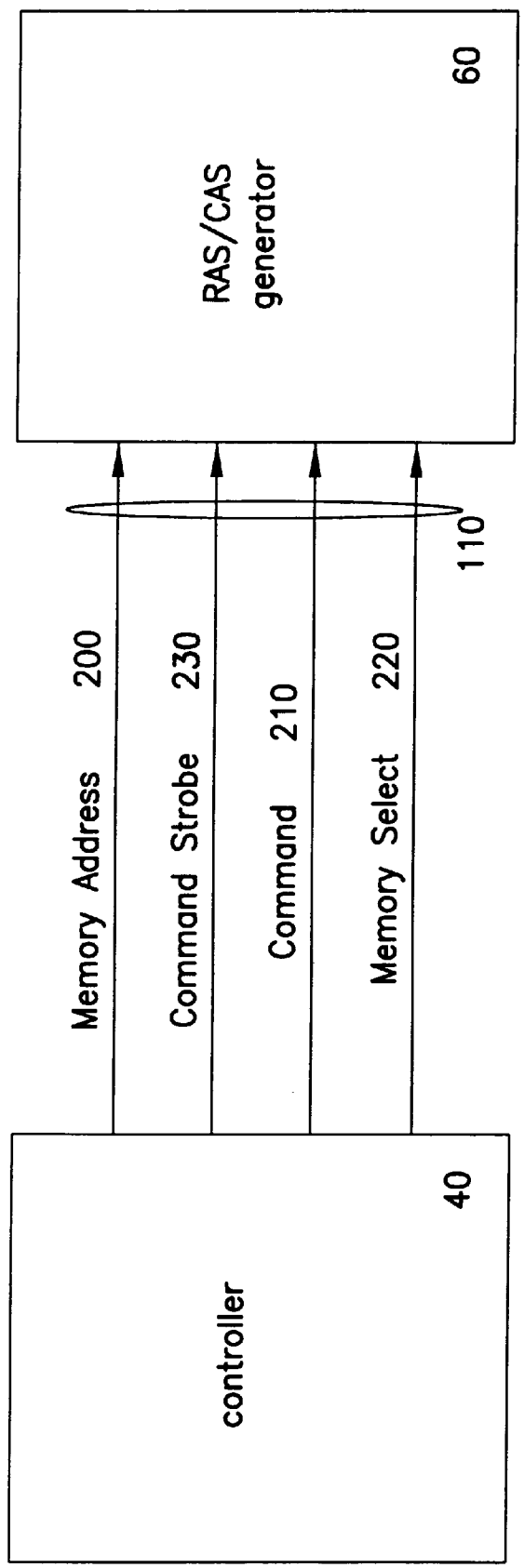
FIG. 2 depicts the signals communicated between the controller and the RAS/CAS generators via the request initiate group according to an embodiment of the present invention.

FIG. 2 depicts the signals communicated between the controller 40 and the RAS/CAS generators 60 via the request initiate group 110 according to the embodiment of the present invention illustrated in FIG. 1. Table 1 provides a summary of the request initiate group 110 signals:

TABLE 1

| Signal | Source | Destination | Definition |
| --- | --- | --- | --- |
| MemoryAddress [13:0] | controller | RAS/CAS generator | Memory address bus signals. These signals define the address of the location to be accessed in the memory. During the first cycle of CommandStrobe active, the RAS addresses are valid. During the clock after |

TABLE 1-continued

| Signal | Source | Destination | Definition |
| --- | --- | --- | --- |
| CommandStrobe | controller | RAS/CAS generator | CommandStrobe active, the CAS addresses are valid. When active, this strobe indicates the initiation of a memory access. |
| Command [1:0] | controller | RAS/CAS generator | These signals, validated with CommandStrobe, encode the command of the current memory operation. A value of 00 in the first cycle indicates a read operation; a value of 01 in the first cycle indicates a write operation; a value of 10 indicates a refresh operation. |
| MemorySelect [5:0] | controller | RAS/CAS generator | These signals, validated with CommandStrobe, indicate the memory board, bank and row targeted by the memory operation. |

Figure 3:
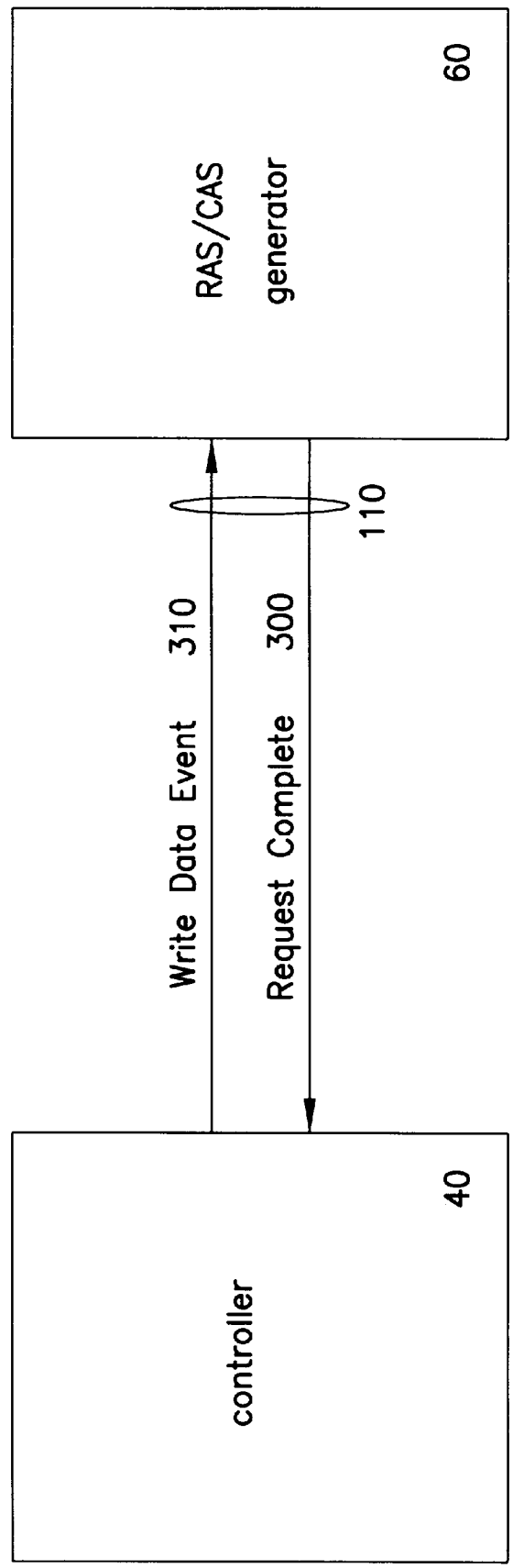
FIG. 3 depicts the handshaking information communicated between the controller and the RAS/CAS generators via the request control group according to an embodiment of the present invention.

FIG. 3 depicts the handshaking signals communicated between the controller 40 and the RAS/CAS generators 60 via the request control group 100 according to the embodiment of the present invention illustrated in FIG. 1. Table 2 provides a summary of the request control group 100 signals:

TABLE 2

| Signal | Source | Destination | Definition |
| --- | --- | --- | --- |
| RequestComplete | RAS/CAS generator | controller | This signal, which is driven by the device selected by MemorySelect, indicates the completion of a request into the memory array. |
| WriteDataEvent | controller | RAS/CAS generator | This signal is used to identify the window for write data transfers between the data path and the MUX/buffer. The signal informs the RAS/CAS generators that a particular data transfer corresponds to a write transaction. |

Figure 4:
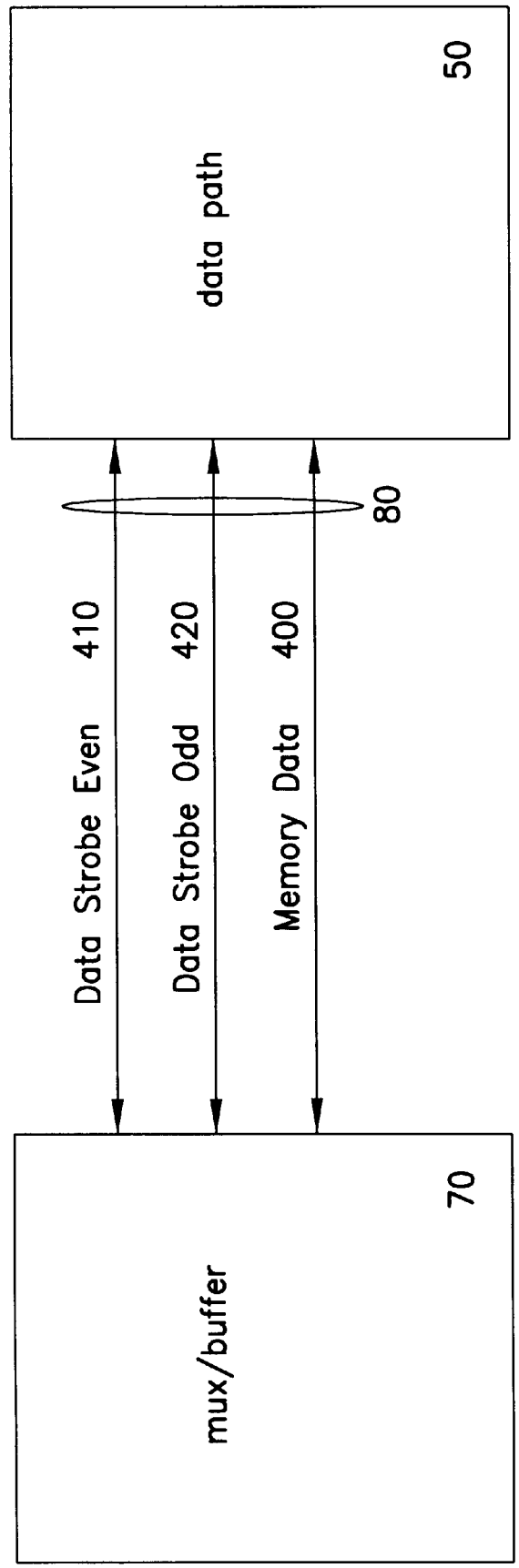
FIG. 4 depicts the data information communicated between the multiplexer/buffers and the data path via the data transfer group according to an embodiment of the present invention.

FIG. 4 depicts the data information communicated between the multiplexer/buffers 70 and the data path 50 via the data transfer group 80 according to the embodiment of the present invention illustrated in FIG. 1.

Table 3 provides a summary of the data transfer group 80 signals:

| Signal | Source | Destination | Definition |
| --- | --- | --- | --- |
| MemoryData [72:0] | MUX/buffer, data path | MUX/buffer, data path | These are the data transfers signals. |
| DataStrobeOdd [3:0] | MUX/buffer, data path | MUX/buffer, data path | These signals qualify the validity of the first and third QWORDS of a data transfer. (Where a QWORD is an, e.g., 64-bit data element). |
| DataStrobeEven | MUX/buffer, | MUX/buffer, | These signals qualify the |

-continued

| Signal | Source | Destination | Definition |
|---|---|---|---|
| [3:0] | data path | data path | validity of the first and third QWORDS of a data transfer (where a QWORD is, for example, a 64-bit data element). |

Figure 5:
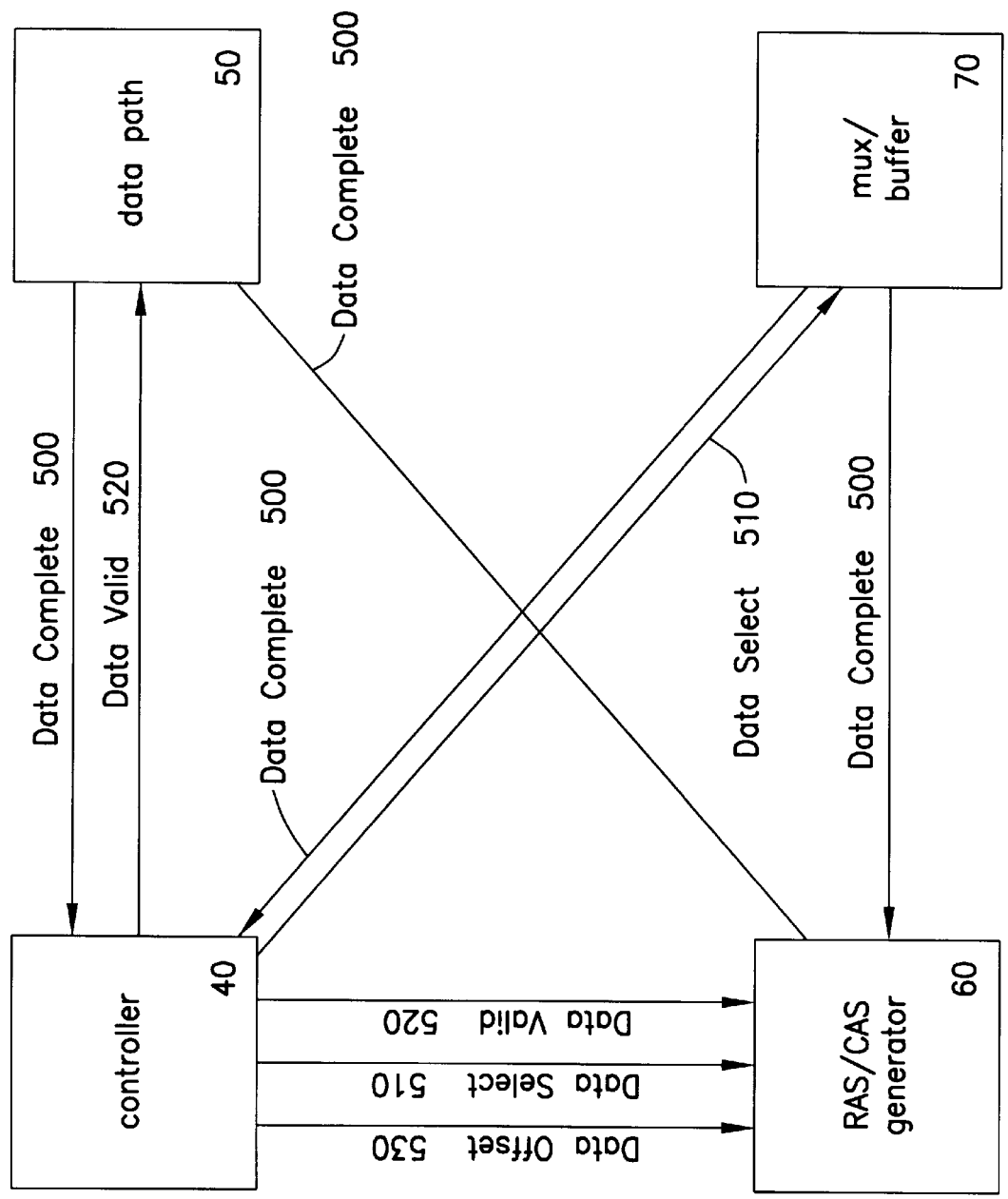
FIG. 5 depicts the handshaking information communicated between the various components of the present memory interface via the data control group according to an embodiment of the present invention.

FIG. 5 depicts the handshaking information communicated between the various components of the present memory interface via the data control group 90 according to the embodiment of the present invention illustrated in FIG. 1. Table 4 provides a summary of the data control group 90 signals:

TABLE 4

| Signal | Source | Destination | Definition |
|---|---|---|---|
| DataSelect [1:0] | controller | RAS/CAS generator, data path | These signals indicate the memory card for which is the source or destination for the next data transfer. |
| DataOffset [1:0] | controller | RAS/CAS generator | These two bits define the initial QWORD access order for the data transfer. |
| DataValid | controller | RAS/CAS generator, data path | This signal, when active, indicates that the DataSelect signal is valid. It is activated, at the minimum, in the second clock after DataSelect is active. It is repeated, at most, every two clocks. |
| DataComplete | MUX/buffer, data path | controller, RAS/CAS generator | This signal is driven by the source of the data transfer during valid DataSelect activation. When active, it indicates that the data transfer is complete. This signal is activated one clock before the last data transfer clock on the data transfer group. |

Memory requests initiated by, e.g., the processor subsystem 30 or an I/O device, are communicated to the memory subsystem over the processor/system bus 130. Memory requests are received from the processor/system bus 130 by the controller 40, and stored in the controller's memory request queue 45. From these stored memory requests, the controller 40 generates Command signals 210, which it communicates to the various RAS/CAS generators 60 via the request initiate group 110 communication lines.

The controller 40 need not wait for a particular memory request to be completed before it issues further memory requests to the RAS/CAS generators 60. This memory transaction concurrency, or pipelining, allows for highly efficient accessing of the memory subsystem. While multiple memory requests, initiated by the controller 40, may be outstanding at a given time, the data transfers related to these memory requests occur in the same time order as the issued requests. Note, however, that the generation of memory requests to the RAS/CAS generators 60 by the controller 40 does not necessarily occur in the same time order as the memory requests were received by the controller 40 from the processor/system bus 130. That is, the memory request queue 45 is not necessarily a first-in first-out (FIFO) queue.

In order to reduce transaction overhead time, the RAS/CAS generators 60 are each capable of buffering multiple memory requests issued by the controller 40. In one embodiment of the present invention, the RAS/CAS generators 60 are capable of buffering two memory requests per each associated memory bank 20. In the embodiment of the present invention illustrated in FIG. 1, thus, each RAS/CAS generator interfaces with two memory banks 20, and thus is capable of buffering a total of four memory requests.

The controller 40 tracks the number of outstanding memory requests that have been issued to each of the RAS/CAS generators 60. When a particular RAS/CAS generator 60 has reached its maximum number of outstanding requests for a particular memory bank 20, the controller 40 waits until one of those requests has been completed before it issues a subsequent request to the RAS/CAS generator 60 for that memory bank 20.

The RAS/CAS generators 60, upon reception of memory transaction commands from the controller 40, generate the appropriate RAS/CAS memory timing signals and apply them to the memory banks 20. The multiplexer/buffers 70 include data buffers for buffering data coming from or going to the memory banks 20 via the memory data bus 10. In one embodiment of the present invention, each multiplexer/buffer 70 includes separate, 2-deep buffers for incoming data (i.e., data to be written to the memory banks 20) and outgoing data (i.e., data read from the memory banks 20). The amount of multiplexing needed depends upon the amount of memory interleaving in the memory subsystem, as well as upon the data width of the data transfer group 80 communication lines. If the memory interleaving is 1:1, for example, there may be no multiplexing needed, as the output data width of the memory banks 20 may be the same as the data width of the data transfer group 80.

In one embodiment of the present invention, the memory interface is used in conjunction with a processor/system bus 130 having a 64-bit data width, a processor subsystem 30 having a 256-bit cache line width, and memory banks 20 having 4:1 interleaving. In this embodiment, the memory data bus 10 has a 256-bit data width, and the multiplexer/buffers 70 each include four 64-bit to 16-bit multiplexing elements. Thus, according to this embodiment, each access to the memory banks 20 is on a cache line basis (i.e., 256 bits), and the multiplexer/buffers 70 multiplex the 256 bits down to 64 bits for outgoing data (i.e., read data) and demultiplex 64 bits to 256 bits for incoming (i.e., write) data.

A read transaction according to the illustrated embodiment of the present invention is performed as follows. The controller 40 receives the memory read transaction over the processor/system bus 130 and places it in the memory request queue 45. Once the read transaction reaches the top of the queue 45, via whatever queue processing algorithm is employed, the controller 40 determines whether the inbound transaction buffer in the RAS/CAS generator 60 coupled to the memory bank 20 targeted by the read operation is full. If not, the controller 40 generates a Command 210 signal, indicating a read operation, a MemoryAddress 200 signal, with the address of the main memory location targeted by the read, a MemorySelect signal 220, indicating the memory card 140, memory bank 20, and memory row within the bank 20 targeted by the read, and a CommandStrobe 230 signal, indicating that the memory operation can commence. The Command 210, MemoryAddress 200, MemorySelect 220, and CommandStrobe 230 signals are communicated to the RAS/CAS generators 60 via the request initiate group 110 lines.

The RAS/CAS generator 60 coupled to the targeted memory bank 20 places the Command 210, MemoryAddress 200 and MemorySelect 220 information in its inbound transaction buffer, generates the appropriate RAS/CAS memory timing signals and applies them to the targeted memory bank 20. The RAS/CAS generator 60 then sends a RequestComplete 300 signal to the controller 40, over the request control group 100 lines, signaling guaranteed completion of the memory operation by the RAS/CAS generator 60.

In one embodiment of the present invention, the controller 40 and the RAS/CAS generators 60 in the memory subsystem each maintain a FIFO queue containing all outstanding memory transactions issued by the controller 40 over the request initiate group 110 lines. In this embodiment, each RAS/CAS generator 60 waits until the memory operation it has just completed reaches the top of the FIFO before it sends a RequestComplete 300 signal to the controller 40. Thus, reception of a RequestComplete 300 signal informs the controller 40 of completion of the oldest outstanding memory transaction, and RequestComplete 300 signals occur in the same time order as their corresponding memory Command 210 signals.

After issuing the Command 210 signal for the read operation to the RAS/CAS generator 60, the controller 40, via the private communication bus 120, sends an inbound data buffer write command to the data path 50, informing the data path 50 of the forthcoming read data, and instructing the data path 50 as to which data buffer 55 to place the incoming read data into. In the illustrated embodiment of the present invention, the controller 40 maintains information regarding which data buffers 55 on the data path 50 contain what data and which are available to take in new data.

In response to the RAS/CAS timing signals, the memory bank 20 outputs the targeted read data to its multiplexer/buffer 70 via the memory data bus 10, where the data is multiplexed, if necessary, and buffered. Latching of the read data into the multiplexer/buffer 70 is controlled by a signal, internal to the memory card 140, from the RAS/CAS generator 60 to the data multiplexer/buffer 70.

After receiving, from the RAS/CAS generator 60, the RequestComplete 300 signal corresponding to the read transaction, the controller 40 activates the appropriate DataSelect 510, DataValid 520, and DataOffset 530 signals for the data transfer. The DataSelect 510 and DataOffset 530 signals indicate to the data path 50 and to the RAS/CAS generators 60 which memory card 140 is the source of the read data as well as which order the QWORDS within the data are to be accessed. The DataValid 520 signal indicates that the data transfer can commence. In one embodiment of the present invention, the controller 40 can activate the DataSelect 510 and DataOffset 530 signals prior to reception of the RequestComplete 300 signal (but following issuance of the Command 210 signal) for the read operation, in order to make early preparation for the upcoming data transfer. In this embodiment, the DataValid 520 signal, indicating that a data transfer can commence, is activated once the RequestComplete 300 for the read is received.

In response to the DataSelect 510/DataOffset 530/DataValid 520 signals, the appropriate RAS/CAS generator 60 triggers, via an intra-memory card 140 signal, the transmission of the data, as a MemoryData 400 signal, from its corresponding multiplexer/buffer 70, over the data transfer group 80 lines, to the data path 50. Once the data transfer is complete, the multiplexer/buffer 70 generates a DataComplete 500 signal, which informs the controller 40 and the data path 50 of the completion of the data transfer to the data path 50, so that the controller 40 can initiate data transfers for other memory transactions. Similar to the relationship between the Command 210 and RequestComplete 300 signals, DataComplete 500 signals are issued in the same time order as the corresponding DataValid 520/DataSelect 510/Data Offset 530 signals for the data transfer.

Once the read data is in a data buffer 55 on the data path 50, the controller 40 requests ownership of the processor/system bus 130 and, via the private bus 120, directs transfer of the read data by the data path 50 from the data buffer 55 onto the processor/system bus 130 for delivery to the entity (e.g., processor 30 or I/O device) requesting the data.

Depending upon the interleaving employed in the memory subsystem, a single memory read transaction in the memory request queue 45 of the controller 40 may trigger the generation of multiple memory read commands by the controller to the RAS/CAS generators 60. If the interleaving value is such that the amount of data available from one memory access is less than the cache line size of the computer system, then multiple reads may be necessary in order to access the cache line width of data targeted by the read transaction issued to the memory interface.

A write transaction according to the illustrated embodiment of the present invention is performed as follows. When a write transaction is issued to the controller 40 over the processor/system bus 130, the controller 40, via the private bus 120, directs the data path 50 to take the write data from the processor/system bus 130 and place it in a particular one of the data buffers 55. When the controller 40 is ready for the write data to be transferred from the data path 50 to the multiplexer/buffer 70, the controller 40 issues DataSelect 510/DataOffset 530/DataValid 520 signals, which instruct the data path 50 to place the data on the data transfer group 80 and instruct the appropriate multiplexer/buffer 70 to load in, demultiplex, and buffer the data from the data transfer group 80.

Once the write data is loaded into the multiplexer/buffer 70, the controller 40 issues a write command (i.e., issues the appropriate Command 210, MemoryAddress 200, MemorySelect 220 and CommandStrobe 230 commands) over the request initiate group 110 to instruct the RAS/CAS generator 60 coupled to the memory bank 20 targeted by the write data to issue the necessary RAS/CAS signals to enable the data from the multiplexer/buffer 70 to be written to the memory bank 20. Once these RAS/CAS signals are issued, the RAS/CAS generator 60 generates a RequestComplete 300 signal to the controller 40 over the request control group 100. In one embodiment of the present invention, write commands from the controller 40 to the RAS/CAS generators 60 are issued in the same time order that write data is transferred from the data path 50 to the multiplexer/buffers 70.

A memory read transaction consists of a read operation (i.e., generation and application of the commands and RAS/CAS timing signals necessary to elicit the read data from the appropriate memory bank 20) followed by a data transfer operation (i.e., transfer of the read data from the appropriate multiplexer/buffer 70 to the data path 50). In constrast, a memory write transaction consists of a data transfer operation (i.e., transfer of write data from the data path 50 to the appropriate multiplexer/buffer 70) followed by a write operation (i.e., generation and application of the commands and RAS/CAS timing signals necessary to load the write data from the multiplexer/buffer 70 into the memory bank 20).

Because the data transfer operation of a write transaction occurs prior to the write operation (and thus prior to the Command 210/MemorySelect 220/MemoryAddress 200 signals informing the RAS/CAS generators of the write transaction), a WriteDataEvent 310 signal is used by the controller 40, in conjunction with the DataSelect 510/DataValid 520/Data Offset 530 signals, to inform the RAS/CAS generators 60 that a particular data transfer from the data path 50 to a data multiplexer/buffer 70 corresponds to a write transaction. The WriteDataEvent 310 signal allows the DataSelect 510/DataValid 520/DataOffset 530 signals to be used for both read and write data transfer operations. When WriteDataEvent 310 is inactive, the data transfer signals (i.e., DataSelect 510/DataValid 520/DataOffset 530) indicate that a particular data transfer is associated with a read transaction, and when WriteDataEvent 310 is active, the data transfer signals indicate that the data transfer is associated with a write transaction.

DRAM memory refresh operations according to the illustrated embodiment of the present invention are performed as follows. The controller 40 ensures that the entire memory subsystem refresh rate is maintained by issuing Command 210 and MemorySelect 220 signals for refresh operations periodically. In response to these signals from the controller 40, the RAS/CAS generators 60 issue, e.g., CAS-before-RAS refresh signals to the targeted rows within the memory banks 20, followed by RequestComplete 300 signals to the controller 40. In one embodiment of the present invention, refresh commands are sent by the controller 40 at staggered intervals, so as to help reduce the instantaneous power requirements in the memory subsystem.

Figure 6:
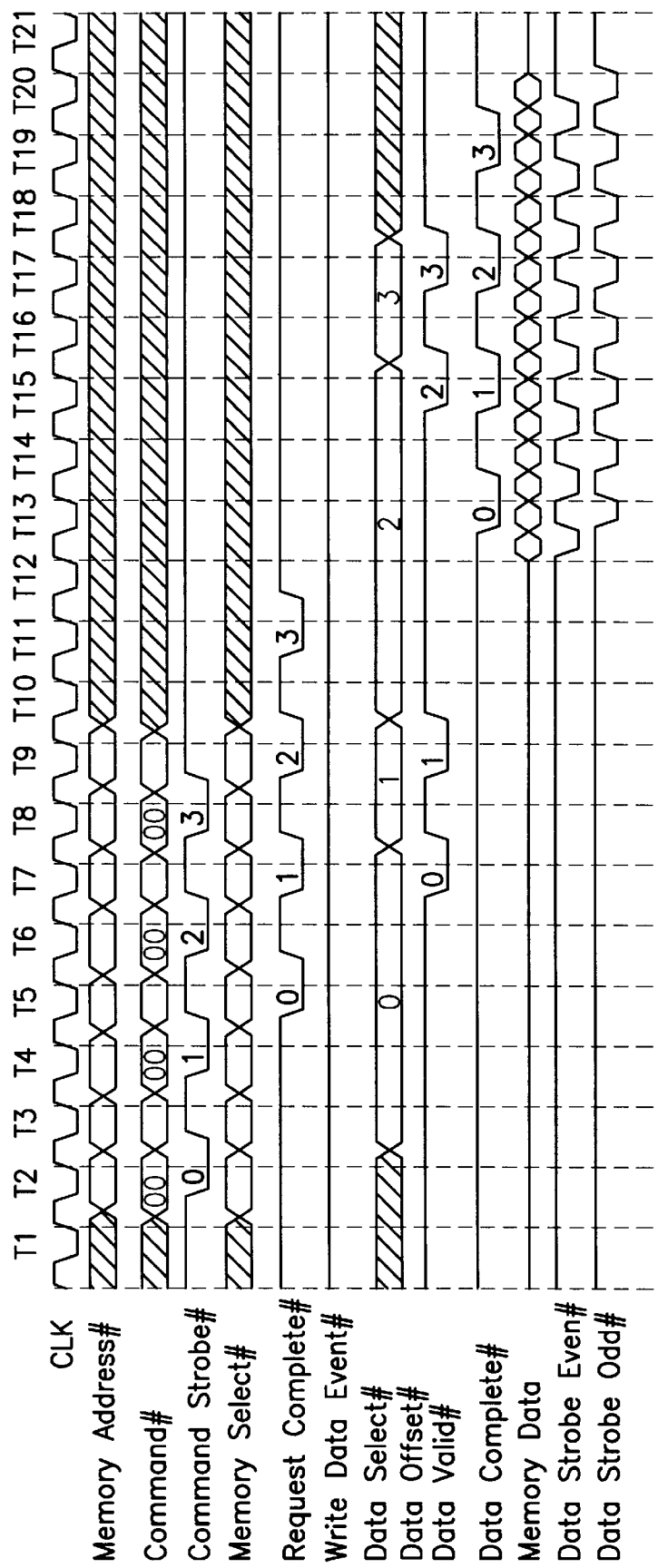
FIG. 6 is a timing diagram depicting a series of read operations according to an embodiment of the present invention.

FIG. 6 is a timing diagram depicting a series of four 32-byte read operations according to an embodiment of the present invention. For each of the read operations (0–3), the controller 40 generates the appropriate MemoryAddress 200, MemorySelect and Command 210 signals, then activates a CommandStrobe 230 signal to trigger initiation of the memory access for the read operation by the RAS/CAS generators 60. Once the RAS/CAS 60 coupled to the memory bank 20 targeted by the read has generated the necessary RAS/CAS memory timing signals and applied them to the memory bank 20, the RAS/CAS generator 60 initiates a RequestComplete 300 signal.

The controller 40 generates the DataSelect 510 and DataOffset 530 signals necessary for the transfer of the read data from the multiplexer/buffer 70 to the data path 50, and, once the controller 40 observes the RequestComplete 300 signal for the read operation, generates a DataValid 520 signal, to trigger the data transfer. The read data is then sent over the data transfer group 80, as a MemoryData 400 signal, to the data path 50. Upon completion of the data transfer, the DataComplete 500 signal is activated.

Figure 7:
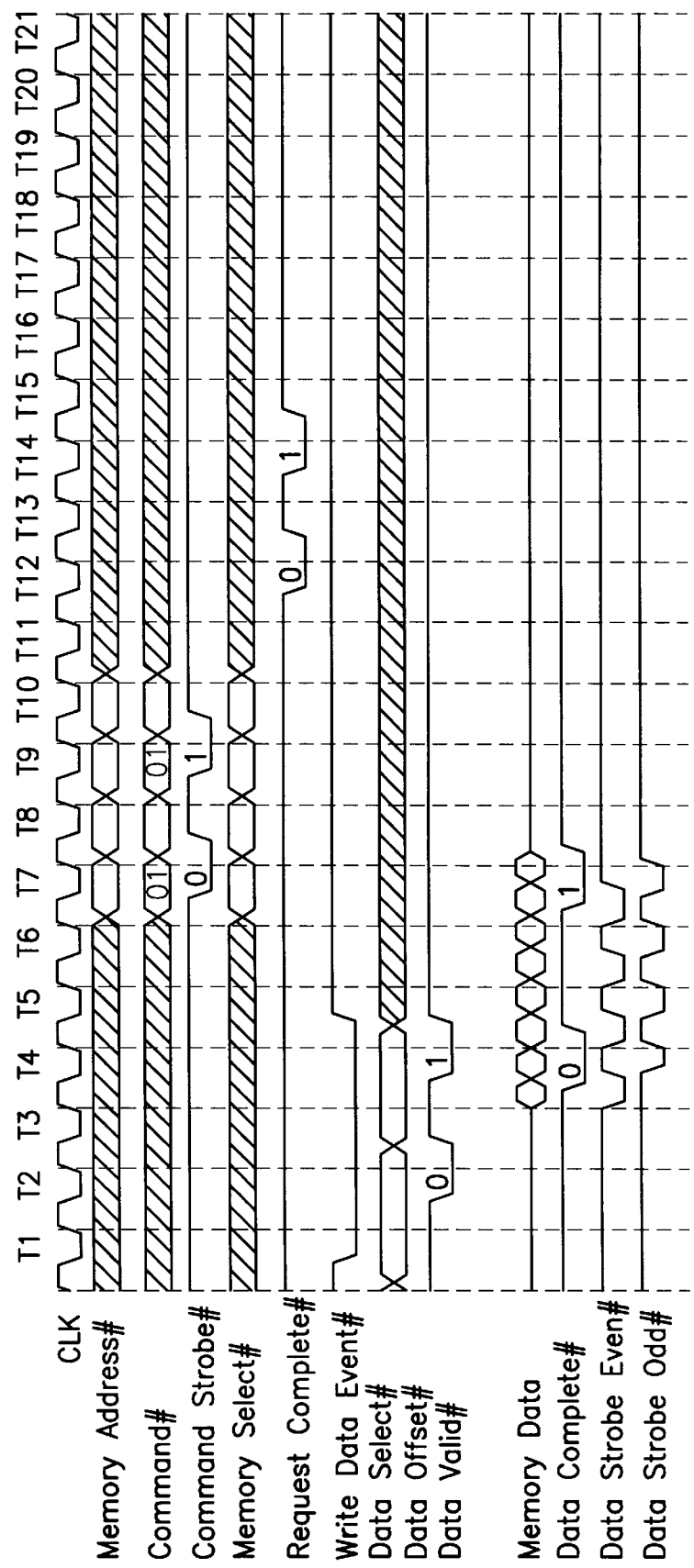
FIG. 7 is a timing diagram depicting a series of write operations according to an embodiment of the present invention.

FIG. 7 is a timing diagram depicting a series of two 32-byte write operations according to an embodiment of the present invention. Before initiating the transfer of the write data from the data path 50 to the data multiplexer/buffer 70, the controller 40 activates the WriteDataEvent 310 signal, to alert the RAS/CAS generators 60 to the impending write data transfer. For each of the write operations (write 0 and write 1), the controller 40 then generates the appropriate DataSelect 510/DataOffset 530/DataValid 520 signals for the write data transfer. In response to these signals, the write data is transferred, as a MemoryData 400 signal, over the data transfer group 80, and a DataComplete 500 signal is generated.

Once the write data is in the multiplexer/buffer 70 (i.e., once the DataComplete 500 signal is activated), the controller 40 initiates a write operation, by generating the appropriate MemoryAddress 200, MemorySelect 220, Command 210 and CommandStrobe 230 signals. In response to these signals, the RAS/CAS generator 60 coupled to the memory bank targeted by the write data generates the appropriate RAS/CAS timing signals to trigger the loading of the write data into the memory bank 20, then issues a RequestComplete 300 signal.

Figure 8:
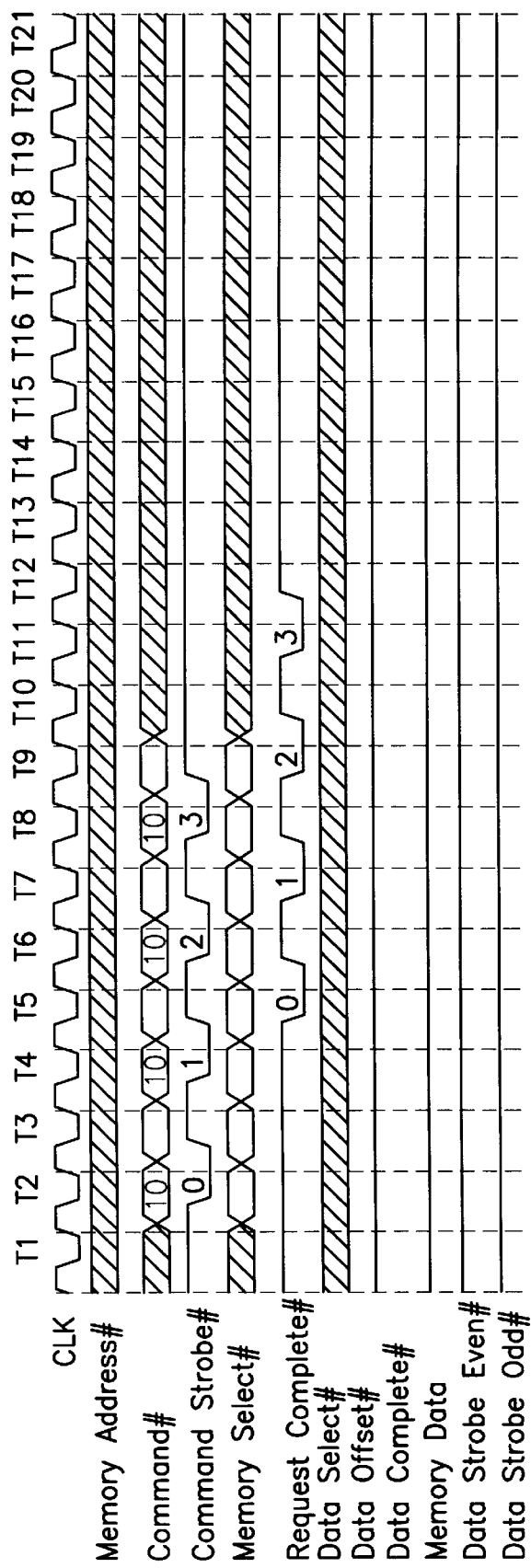
FIG. 8 is a timing diagram depicting a series of refresh operations according to an embodiment of the present invention.

FIG. 8 is a timing diagram depicting a series of four refresh operations according to an embodiment of the present invention. Each refresh operation is initiated by the generation of the appropriate Command 210 and Memory-Select 220 signals by the controller 40, followed by activation of a CommandStrobe 230 signal to initiate the memory refresh operation by the appropriate RAS/CAS generator 60. Following generation and issuance of the RAS/CAS signals for the refresh operation, the RAS/CAS generator 60 coupled to the memory bank 20 targeted by the refresh operation generates a RequestComplete 300 signal.

Complex memory transactions received by the controller 40, such as partial write operations which require a read-modify-write sequence, are implemented by the controller 40 as a read operation followed by a write operation. All data merging necessary for such operations is performed, according to one embodiment of the present invention, in the data path 50, where error correction code (ECC) checking and other computations related to these complex operations are performed. All memory transactions received by the controller 40 over the processor/system bus 130 are processed atomically, meaning that, if any transaction requires more than one memory transaction command from the controller 40 to the appropriate RAS/CAS generator 60, all the memory commands for that transaction are processed before a new set of memory commands for a new transaction are issued by the controller 40.

In order to increase the speed with which memory accesses are performed, the memory interface according to one embodiment of the present invention includes a feature whereby read operations are issued to the memory interface's controller 40, via the processor/system bus 130, as quickly as possible, which may be before the results of the snoop of the read by any writeback cache memory(ies) within the processor subsystem 30 are known. This feature provides for an overall decrease in memory access times, because, even in the most extreme system configurations, generally fewer than half of all read operations are converted to implicit writeback operations. By employing this feature, latency for read operations is minimized. In embodiments of the present invention employing this feature, read operations to the memory subsystem will complete, even if a cache line hit occurs, as if there were no implicit writeback conversion; the read operation is never aborted.

The memory interface according to the present invention is independent of the type of memory used in the main memory banks 20. For example, synchronous DRAM, next generation DRAM, or extended data out (EDO) memory may be used in the memory banks 20 in conjunction with the present high speed memory interface.

As discussed above, the present memory interface may be used in memory subsystems employing memory interleaving. This interleaving may be within a memory bank 20, or it may be across two or more memory banks 20.

Although various embodiments are specifically illustrated and described herein, it will be appreciated that modifications and variations of the present invention are covered by the above teachings and within the purview of the appended claims without departing from the spirit and intended scope of the invention. Such variations might include, for example, changes in the number of memory cards 140 in the computing system, changes in the number of RAS/CAS generators 60 per memory card 140, changes in the number of memory banks 20 per RAS/CAS generator 60, etc.

What is claimed is:

1. A high speed memory interface for interconnecting a main memory having a plurality of memory banks to a processor/system bus, the interface comprising (A) a single controller coupled to the processor/system bus;

(B) at least two memory cards coupled to the controller;

(C) A plurality of RAS/CAS generators, each coupled to the controller and to a corresponding one of the plurality of memory banks;

(D) a data multiplexer/buffer coupled to the plurality of memory banks; and (E) a data path coupled between the data multiplexer/buffer and the processor/system bus.

2. The high speed memory interface according to claim 1, wherein each RAS/CAS generator is coupled to a plurality of memory banks.

3. The high speed memory interface according to claim 1, further comprising:

(E) a request initiate group coupled between the controller and the plurality of RAS/CAS generators;

(F) a request control group coupled between the controller and the plurality of RAS/CAS generators;

(G) a data transfer group coupled between the data path and the data multiplexer/buffer;

(H) a data control group coupled to the data path, the data multiplexer/buffer;

the plurality of RAS/CAS generators and the controller; and (I) a processor/bus group coupled between the data path and the controller.

4. The high speed memory interface according to claim 1, wherein the controller includes a memory request queue.

5. The high speed memory interface according to claim 1, wherein the data path includes a plurality of data buffers.

6. The high speed memory interface according to claim 1, wherein the controller receives incoming memory transaction requests from the processor/system bus, and generates corresponding memory transaction commands to the RAS/CAS generators.

7. The high speed memory interface according to claim 6, wherein snooping operations are performed on the incoming memory read transaction requests while the requests are on the processor/system bus, and wherein the memory read transaction requests are received and processed by the controller without regard to the results of the snooping operations.

8. The high speed memory interface according to claim 3, further comprising:

(E) a memory data bus coupled between the plurality of memory banks and the multiplexer/buffer.

9. The high speed memory interface according to claim 1, wherein memory interleaving is employed within each of the plurality of memory banks, the memory data bus has an associated memory data bus width, the data transfer group has an associated data transfer group width, and the multiplexer/buffer multiplexes and demultiplexes data between the memory data bus width and the data transfer group width.

10. The high speed memory interface according to claim 1, wherein the controller issues memory commands to each of the plurality of RAS/CAS generators, and each of the plurality of RAS/CAS generators is capable of simultaneously storing a plurality of such memory commands.

11. A computing system, comprising:

a processor;

a processor/system bus coupled to the processor/system bus, comprising:

a single controller coupled to the processor/system bus;

at least two memory cards coupled to the controller;

a plurality of memory banks;

a plurality of RAS/CAS generators, each coupled to the controller and to a corresponding one of the plurality of memory banks;

a data multiplexer coupled to the plurality of memory banks; and a data path coupled between the data multiplexer and the processor/system bus.

* * * * *

UNITED STATES PATENT AND TRADEMARK OFFICE
CERTIFICATE OF CORRECTION

PATENT NO. : 5,996,042
DATED : Nov. 30, 1999
INVENTOR(S) : PAWLOWSKI et al.

It is certified that error appears in the above-indentified patent and that said Letters Patent is hereby corrected as shown below:

| | |
|---|---|
| Column 4, line 56 | "(Table 3 unlabelled)" should be --TABLE 3-- |
| Column 5, line 23 | "card for which is the source or" should be --card which is the source or-- |
| Column 7, line 42 | "as which order the QWORDS" should be --as the order in which the QWORDS-- |
| Column 11, line 17 | "(E)" should be --(F)-- |
| Column 11, line 19 | "(F)" should be --(G)-- |
| Column 11, line 21 | "(G)" should be --(H)-- |
| Column 11, line 23 | "(H)" should be --(I)-- |
| Column 11, line 28 | "(1)" should be --(J)-- |
| Column 12, line 9 | "(E)" should be --(K)-- |

Signed and Sealed this

Tenth Day of April, 2001

Attest:

NICHOLAS P. GODICI

Attesting Officer

Acting Director of the United States Patent and Trademark Office